United States Patent
Bogaki et al.

(10) Patent No.: US 12,094,285 B2
(45) Date of Patent: Sep. 17, 2024

(54) FLUORESCENCE/PHOSPHORESCENCE DETECTION DEVICE, PAPER SHEET PROCESSING DEVICE, AND FLUORESCENCE/PHOSPHORESCENCE DETECTION METHOD

(71) Applicant: Glory Ltd., Himeji (JP)

(72) Inventors: Akira Bogaki, Himeji (JP); Fumiaki Shimaoka, Himeji (JP)

(73) Assignee: GLORY LTD., Himeji (JP)

(*) Notice: Subject to any disclaimer, the term of this patent is extended or adjusted under 35 U.S.C. 154(b) by 257 days.

(21) Appl. No.: 17/541,279

(22) Filed: Dec. 3, 2021

(65) Prior Publication Data
US 2022/0092904 A1    Mar. 24, 2022

Related U.S. Application Data

(63) Continuation of application No. PCT/JP2020/016005, filed on Apr. 9, 2020.

(30) Foreign Application Priority Data

Jun. 6, 2019  (JP) .................................. 2019-106171

(51) Int. Cl.
  *G01N 21/64* (2006.01)
  *G07D 7/121* (2016.01)
  *G07D 7/17* (2016.01)

(52) U.S. Cl.
  CPC ........... *G07D 7/121* (2013.01); *G01N 21/645* (2013.01); *G07D 7/17* (2017.05); *G07D 2207/00* (2013.01)

(58) Field of Classification Search
  CPC ...... G07D 7/121; G07D 7/17; G07D 2207/00; G07D 7/1205; G01N 21/645;
  (Continued)

(56) References Cited

U.S. PATENT DOCUMENTS

2017/0309107 A1*   10/2017   Sato ..................... G07D 7/121

FOREIGN PATENT DOCUMENTS

| EP | 3671675 A1 | 6/2020 |
|---|---|---|
| JP | 2016-53881 A | 4/2016 |

(Continued)

OTHER PUBLICATIONS

Translation of JP2016053881A (Year: 2016).*
(Continued)

*Primary Examiner* — David P Porta
*Assistant Examiner* — Mamadou Faye
(74) *Attorney, Agent, or Firm* — XSENSUS LLP

(57) ABSTRACT

The present disclosure relates to a fluorescence/phosphorescence detector that detects fluorescence and phosphorescence emitted from a transported sheet, including: a light source configured to irradiate a transported sheet with light; a light receiver configured to receive fluorescence and phosphorescence emitted from the sheet and output fluorescence data and phosphorescence data; and a controller configured to control the light source and acquire fluorescence data and phosphorescence data from the light receiver, the controller being configured to turn on the light source in a first predetermined period, turn on the light source in a second predetermined period after the first predetermined period, keep the light source turned off for a third predetermined period after the second predetermined period, acquire fluorescence data on fluorescence received by the light receiver in the second predetermined period, and acquire phosphorescence data on phosphorescence received by the light receiver in the third predetermined period.

9 Claims, 13 Drawing Sheets

(58) Field of Classification Search
CPC ....... G01N 2021/8663; G01N 21/6456; G01N 21/86; G01N 21/6408
See application file for complete search history.

(56) References Cited

FOREIGN PATENT DOCUMENTS

| | | | |
|---|---|---|---|
| JP | 2016053881 A | * | 4/2016 |
| JP | 2019-35701 A | | 3/2019 |

OTHER PUBLICATIONS

International Search Report and Written Opinion mailed on Jun. 30, 2020, received for PCT Application PCT/JP2020/016005, Filed on Apr. 9, 2020, 8 pages including English Translation.

* cited by examiner

FLUORESCENCE/PHOSPHORESCENCE DETECTION DEVICE, PAPER SHEET PROCESSING DEVICE, AND FLUORESCENCE/PHOSPHORESCENCE DETECTION METHOD

CROSS-REFERENCE TO RELATED APPLICATIONS

The present application is a Continuation Application of PCT Application No. PCT/JP2020/016005 filed on Apr. 9, 2020, which claims priority to Japanese Patent Application No. 2019-106171 filed on Jun. 6, 2019 under the Paris Convention and provisions of national law in a designated State. The entire contents of each application are hereby incorporated by reference.

TECHNICAL FIELD

The present disclosure relates to fluorescence/phosphorescence detectors, sheet handling devices, and fluorescence/phosphorescence detection methods. The present disclosure more specifically relates to a fluorescence/phosphorescence detector, a sheet handling device, and a fluorescence/phosphorescence detection method which are suitable for acquiring a fluorescence image and a phosphorescence image of a sheet.

BACKGROUND

There are devices that are known to detect the fluorescence characteristics of a transported sheet while irradiating the sheet with excitation light, and then detect phosphorescence emitted from the sheet with the excitation light turned off. Such detection of phosphorescence from a sheet requires sufficient excitation energy to be accumulated in the sheet.

For example, the excitation light detector described in JP 6316148 B detects the fluorescence characteristics of a sheet by supplying a current to the light source in advance and irradiating a transported sheet with ultraviolet light. The detector then increases the amount of current supplied to the light source or lengthens the time of current supply to the light source to irradiate the sheet with ultraviolet light, thus increasing the ultraviolet light energy accumulated in the sheet. The detector stops the irradiation with light from the light source and then detects phosphorescence emitted from the sheet.

SUMMARY

The present disclosure relates to a fluorescence/phosphorescence detector that detects fluorescence and phosphorescence emitted from a transported sheet, the detector including: a light source configured to irradiate a transported sheet with light; a light receiver configured to receive fluorescence and phosphorescence emitted from the sheet and output fluorescence data and phosphorescence data; and a controller configured to control the light source and acquire fluorescence data and phosphorescence data from the light receiver, the controller being configured to turn on the light source in a first predetermined period, turn on the light source in a second predetermined period after the first predetermined period, and keep the light source turned off for a third predetermined period after the second predetermined period, the controller being configured to acquire fluorescence data on fluorescence received by the light receiver in the second predetermined period and acquire phosphorescence data on phosphorescence received by the light receiver in the third predetermined period.

The present disclosure also relates to a fluorescence/phosphorescence detection method including: turning on a light source and irradiating a transported sheet with light in a first predetermined period; turning on the light source after a lapse of the first predetermined period, and while irradiating the sheet with light in a second predetermined period, receiving fluorescence emitted from the sheet using a light receiver; while keeping the light source turned off for a third predetermined period after a lapse of the second predetermined period, receiving phosphorescence emitted from the sheet using the light receiver; acquiring fluorescence data on fluorescence received by the light receiver in the second predetermined period; and acquiring phosphorescence data on phosphorescence received by the light receiver in the third predetermined period.

DETAILED DESCRIPTION

Figure 1:
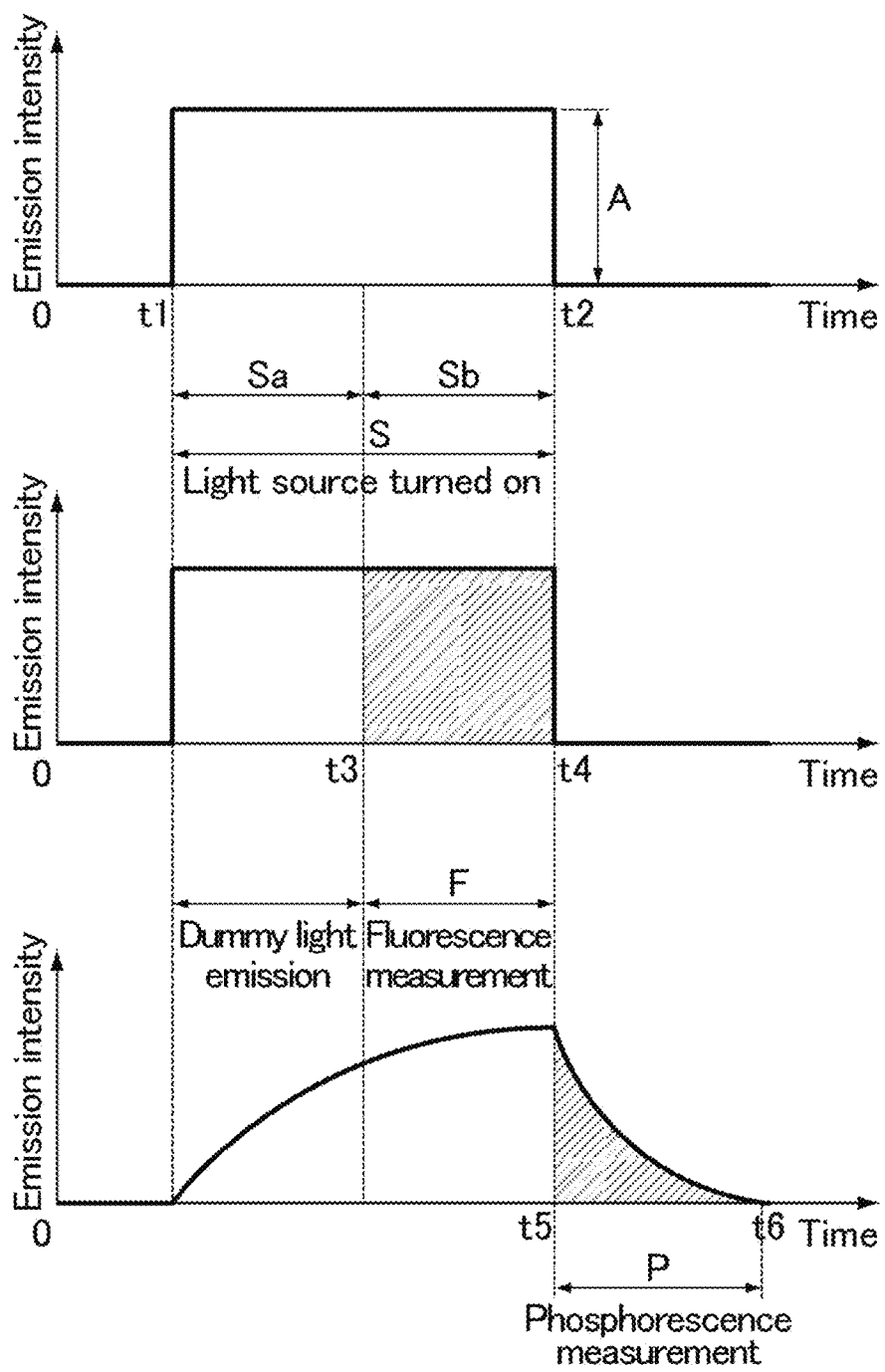
FIG. 1 is a view showing the outline of Embodiment 1.

The excitation light detector described in JP 6316148 B irradiates a sheet with ultraviolet light for accumulation of light as a step between detection of the fluorescence characteristics of the sheet and detection of the phosphorescence characteristics of the sheet. Since the sheet is transported while being irradiated with the ultraviolet light for accumulation of light, the difference between the position where fluorescence is detected and the position where phosphorescence is detected may increase.

In response to the above current state of the art, an object of the present disclosure is to provide a fluorescence/phosphorescence detector, a sheet handling device, and a fluorescence/phosphorescence detection method which can reduce the difference between the position where fluorescence is detected and the position where phosphorescence is detected.

In order to solve the above issue and to achieve the object, one aspect of the present disclosure is directed to a fluorescence/phosphorescence detector that detects fluorescence and phosphorescence emitted from a transported sheet, the detector including: a light source configured to irradiate a transported sheet with light; a light receiver configured to receive fluorescence and phosphorescence emitted from the sheet and output fluorescence data and phosphorescence data; and a controller configured to control the light source and acquire fluorescence data and phosphorescence data from the light receiver, the controller being configured to turn on the light source in a first predetermined period, turn on the light source in a second predetermined period after the first predetermined period, and keep the light source turned off for a third predetermined period after the second predetermined period, the controller being configured to acquire fluorescence data on fluorescence received by the light receiver in the second predetermined period and acquire phosphorescence data on phosphorescence received by the light receiver in the third predetermined period.

In another aspect of the present disclosure, the controller is configured to control the light source such that an amount of light applied to the sheet in the second predetermined period is smaller than an amount of light applied to the sheet in the first predetermined period.

In another aspect of the present disclosure, the controller is configured to control an amount of light emitted from the light source per unit time based on a transport speed of the sheet.

In another aspect of the present disclosure, after a lapse of the third predetermined period, the controller is configured to turn on the light source at least once in a fourth predetermined period in which the light receiver does not receive fluorescence and phosphorescence.

In another aspect of the present disclosure, the light source is an ultraviolet light source.

In another aspect of the present disclosure, the light source is an infrared light source.

In another aspect of the present disclosure, the light source is a visible light source.

Another aspect of the present disclosure is directed to a sheet handling device including the fluorescence/phosphorescence detector.

Another aspect of the present disclosure is directed to a fluorescence/phosphorescence detection method including: turning on a light source and irradiating a transported sheet with light in a first predetermined period; turning on the light source after a lapse of the first predetermined period, and while irradiating the sheet with light in a second predetermined period, receiving fluorescence emitted from the sheet using a light receiver; while keeping the light source turned off for a third predetermined period after a lapse of the second predetermined period, receiving phosphorescence emitted from the sheet using the light receiver; acquiring fluorescence data on fluorescence received by the light receiver in the second predetermined period; and acquiring phosphorescence data on phosphorescence received by the light receiver in the third predetermined period.

The fluorescence/phosphorescence detector, the sheet handling device, and the fluorescence/phosphorescence detection method of the present disclosure can reduce the difference between the position where fluorescence is detected and the position where phosphorescence is detected.

A preferred embodiment of the fluorescence/phosphorescence detector, the sheet handling device, and the fluorescence/phosphorescence detection method of the present disclosure is described hereinbelow with reference to the drawings. Various sheets such as banknotes, checks, vouchers, bills, business forms, documents of value, and card-like media are applicable as sheets used in the present disclosure. Devices and methods for banknotes are used hereinbelow as examples to describe the present disclosure. The following description is for an exemplary fluorescence/phosphorescence detector, an exemplary sheet handling device, and an exemplary fluorescence/phosphorescence detection method.

The term "reflection image" herein means an image based on the intensity distribution of light that has been applied to a sheet and reflected by the sheet.

Summary of the Present Embodiment

Figure 2:
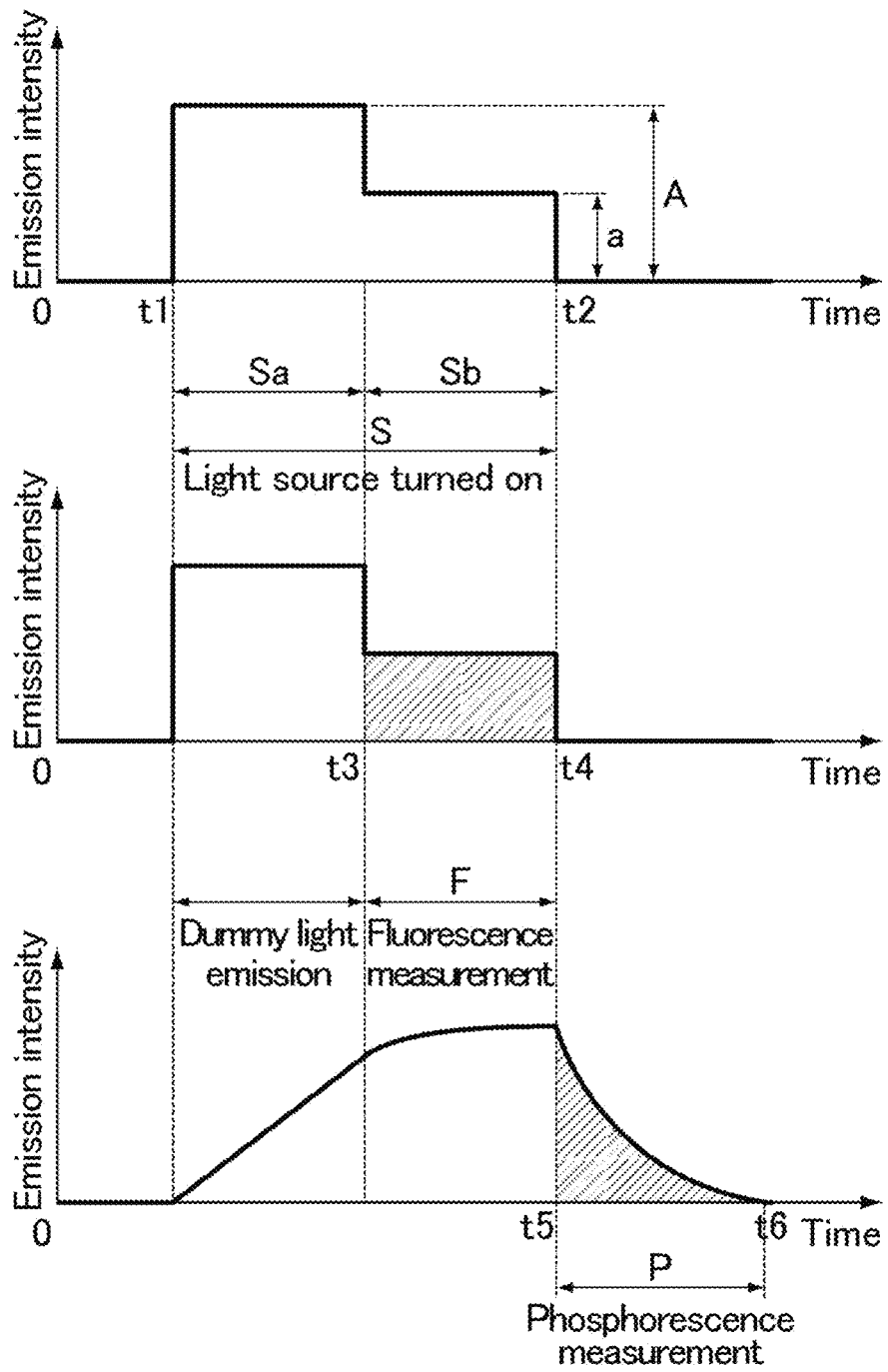
FIG. 2 is another view showing the outline of Embodiment 1.
Figure 3:
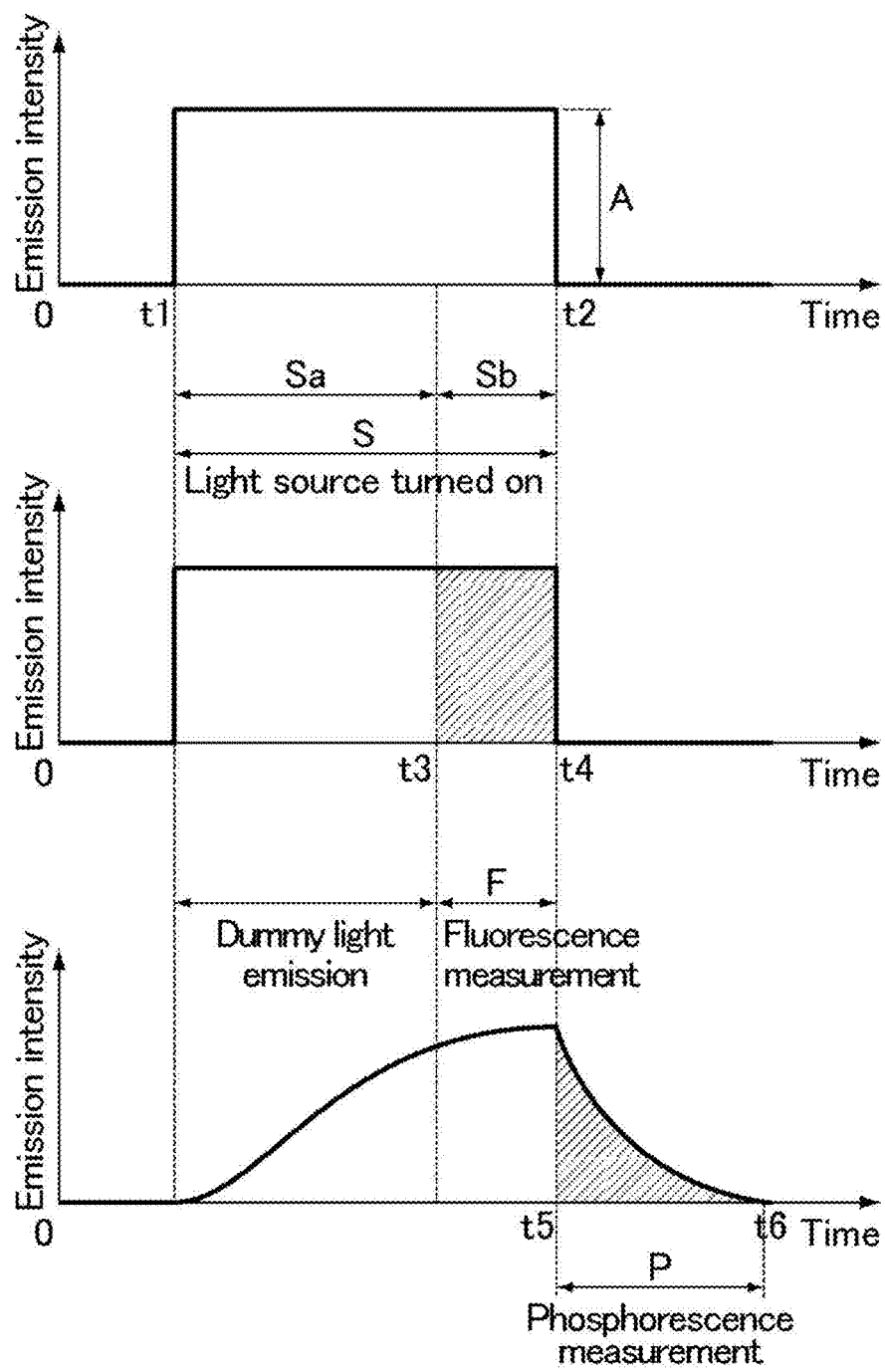
FIG. 3 is yet another view showing the outline of Embodiment 1.

First, the present embodiment is summarized with reference to FIGS. 1 to 3. A fluorescence/phosphorescence detector of the present embodiment includes a light source that applies light to a banknote and a light receiving unit that receives light emitted from a banknote. On each banknote is printed a security mark using a special ink that emits light by receiving excitation light such as ultraviolet light. The security mark emits light when the light source applies excitation light to the banknote. Fluorescence, phosphorescence, or both fluorescence and phosphorescence may be observed depending on the type of the banknote. The present embodiment is applicable to the cases where both fluorescence and phosphorescence are observed.

The fluorescence/phosphorescence detector of the present embodiment controls the light source to apply light to a banknote. As shown in the upper part of FIG. 1, the detector controls the light source to emit light having an emission intensity A for a time period S (t1 to t2). The fluorescence/phosphorescence detector of the present embodiment can control the amount of light (irradiation amount) applied to a banknote from the light source. The amount of light is controlled by changing at least one of the emission intensity A or the emission time period S of light from the light source. The amount of light applied to a banknote varies depending on the emission intensity A of light from the light source. The emission intensity A is controlled by changing, for example, the number of light emitters such as LED elements in the light source or the value of current supplied to the light emitters (e.g., the magnitude of forward current for the LED elements).

The fluorescence/phosphorescence detector of the present embodiment uses the light receiving unit to detect fluorescence emitted from a banknote. As shown in the middle part of FIG. 1, fluorescence emission lasts for the time period S in which the light source is kept turned on. The fluorescence/phosphorescence detector of the present embodiment processes as a fluorescence detection signal a signal that the light receiving unit outputs upon light reception, during a time period F (t3 to t4) in which fluorescence is observed. The hatched part shown in the middle part of FIG. 1 is detected as fluorescence. The fluorescence/phosphorescence detector of the present embodiment can control the time period F in which fluorescence is detected. Also, the fluorescence/phosphorescence detector of the present embodiment can control the timing (t3) of starting fluorescence measurement and the timing (t4) of ending the fluorescence measurement, during the time period (t1 to t2) in which the light source is kept turned on.

The fluorescence/phosphorescence detector of the present embodiment uses the light receiving unit to detect phosphorescence emitted from a banknote. As shown in the lower part of FIG. 1, the emission intensity of phosphorescence gradually increases during the time period S in which the light source is kept turned on. The glow of fluorescence disappears right after the light source is turned off, whereas the glow of phosphorescence lasts even after turning off of the light source while decaying before it disappears. The fluorescence/phosphorescence detector of the present embodiment processes as a phosphorescence detection signal a signal that the light receiving unit outputs upon reception of light, during a time period P (t5 to t6) after the light source is turned off. The hatched part shown in the lower part of FIG. 1 is detected as phosphorescence. The fluorescence/phosphorescence detector of the present embodiment can control the time period P in which phosphorescence is detected. Also, the fluorescence/phosphorescence detector of the present embodiment can control the timing (t5) of starting phosphorescence measurement and the timing (t6) of ending the phosphorescence measurement, after the light source is turned off (after t2). For example, in the case where the time until disappearance of phosphorescence differs depending on the type of banknote, the mode in which phosphorescence is measured while phosphorescence is observed may be set.

The light source emits light at the constant emission intensity A for a time period Sa shown in the upper part of FIG. 1. The light source then emits light at the constant emission intensity A for a time period Sb shown in the upper part of FIG. 1 for measurement of fluorescence indicated by the hatched part shown in the middle part of FIG. 1. If the light source is kept turned off for the time period Sa, measurement of phosphorescence upon turning off of the light source after the lapse of the time period Sb may be executed with an insufficient measurement accuracy because insufficient accumulation of the excitation light energy in a banknote would result in a low emission intensity of phosphorescence. The fluorescence/phosphorescence detector of the present embodiment is therefore configured to emit light from the light source additionally for the time period Sa before the time period Sb, as shown in the upper part of FIG. 1. Such additional emission of light before fluorescence measurement allows application of a sufficient amount of light to a banknote for clear phosphorescence emission. The fluorescence/phosphorescence detector of the present embodiment turns off the light source when the emission intensity of phosphorescence is high enough to measure phosphorescence as indicated by the hatched part in the lower part of FIG. 1. This configuration enables measurement of both fluorescence and phosphorescence with a sufficient measurement accuracy. The configuration also enables fluorescence measurement and phosphorescence measurement continuously, thus reducing the difference between the position on the banknote where fluorescence is detected and the position on the banknote where phosphorescence is detected.

The fluorescence/phosphorescence detector of the present embodiment may employ one or more measurement modes. Each measurement mode allows adjustment of the settings, namely the emission intensity and emission time period of light emitted from the light source, the timing and measurement time period of fluorescence measurement using the light receiving unit, and the timing and measurement time period of phosphorescence measurement using the light receiving unit. The emission time period S of light from the light source can be set by setting a turn-on timing t1 and a turn-off timing t2 of the light source shown in the upper part of FIG. 1. The fluorescence measurement time period F can be set by setting a fluorescence measurement start timing t3 and a fluorescence measurement end timing t4 shown in the middle part of FIG. 1. The phosphorescence measurement time period P can be set by setting a phosphorescent measurement start timing t5 and a phosphorescence measurement end timing t6 shown in the lower part of FIG. 1.

FIG. 2 shows the emission intensities of light from the light source, fluorescence, and phosphorescence as in FIG. 1. While light is emitted from the light source at the constant emission intensity A for the time period S (t1 to t2) in FIG. 1, light is emitted from the light source at a constant emission intensity A for the time period Sa and light is emitted from the light source at a constant emission intensity a (where a<A) for the time period Sb in FIG. 2. This configuration can limit the emission intensity of fluorescence while allowing the amount of light applied to a banknote to be sufficient for clear phosphorescence emission. The configuration therefore can reduce or prevent saturation of fluorescence detection signals in the light receiving unit.

FIG. 3 shows the emission intensities of light from the light source, fluorescence, and phosphorescence as in FIGS. 1 and 2. While the time period Sa in which light is emitted before the start of fluorescence measurement and phosphorescence measurement and the time period Sb in which fluorescence is measured are the same in FIGS. 1 and 2, the time period Sb is shorter than the time period Sa in FIG. 3. This configuration can limit the amount of fluorescence received by the light receiving unit while allowing the amount of light applied to a banknote to be sufficient for clear phosphorescence emission. The configuration therefore can reduce or prevent saturation of fluorescence detection signals in the light receiving unit.

The banknote handling device of the present embodiment receives a plurality of banknotes, takes them in the device one by one, and uses a recognition unit to recognize the types of banknotes, including the denominations, authenticity, and fitness, while transporting the banknotes along the transport path provided in the device. The device uses the fluorescence/phosphorescence detector of the present embodiment placed in the transport path downstream of the recognition unit in the transport direction of banknotes. The recognition unit recognizes the type of each banknote based on the optical characteristics, magnetic characteristics, thickness, and other characteristics as with a conventional device. The recognition unit inputs a banknote recognition result to the fluorescence/phosphorescence detector of the present embodiment. Upon receiving the banknote recognition result, the fluorescence/phosphorescence detector of the present embodiment may switch the mode to a measurement mode corresponding to the type of the banknote. The fluorescence/phosphorescence detector of the present embodiment then measures fluorescence and phosphorescence when the banknote recognized by the recognition unit and transported along the transport path comes to a suitable position. The process above is repeated for each of the successively transported banknotes, so that the light emission can be measured with high accuracy in a measurement mode corresponding to each banknote. The banknote handling device of the present embodiment can use the light emission features of each banknote obtained by the fluorescence/phosphorescence detector of the present embodiment for authentication of the banknote, for example.

Structure of Banknote Handling Device

Figure 4:
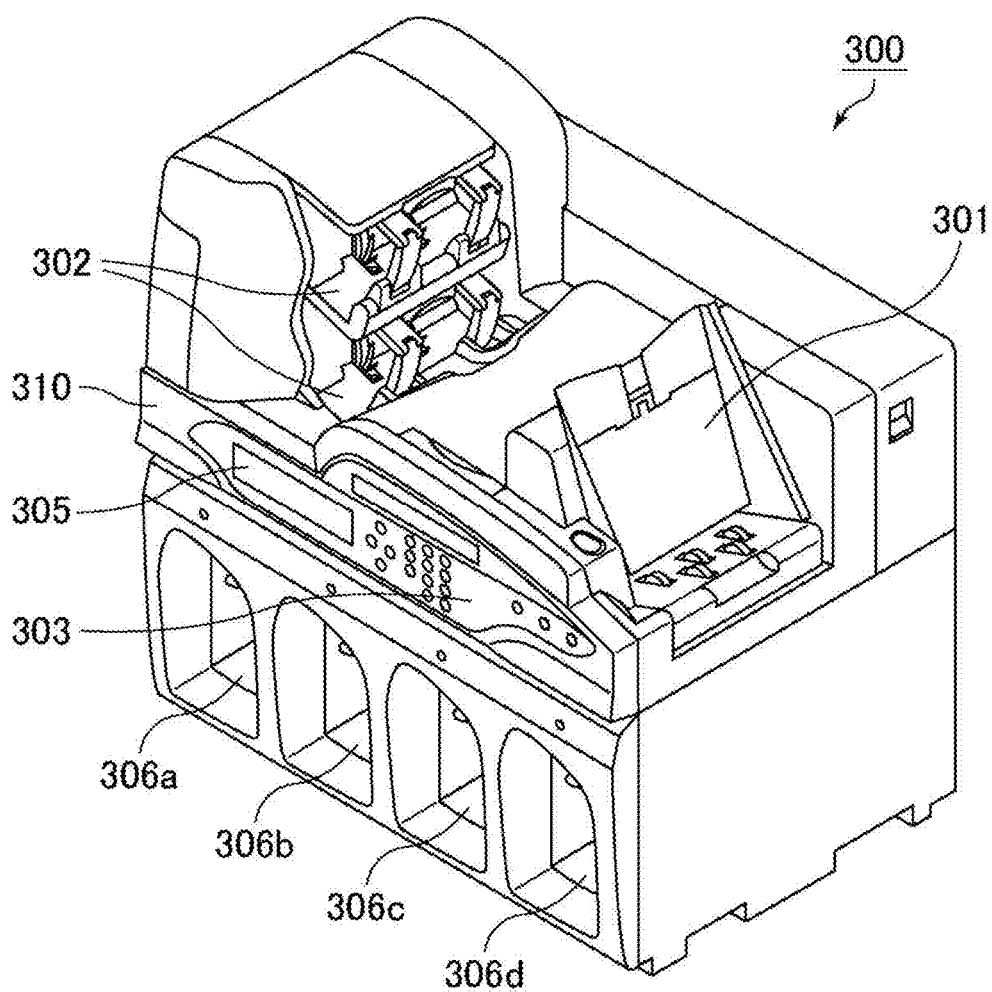
FIG. 4 is a schematic perspective view showing the appearance of a banknote handling device of Embodiment 1.

Next, the structure of the banknote handling device of the present embodiment is described with reference to FIG. 4. The banknote handling device of the present embodiment may have the structure shown in FIG. 4, for example. A banknote handling device 300 shown in FIG. 4 is a small-sized banknote handling device installed on a table for use. The banknote handling device 300 includes a recognition unit (not shown in FIG. 4) that executes the banknote recognition processing; the fluorescence/phosphorescence detector of the present embodiment (not shown in FIG. 4); a hopper 301 in which a plurality of banknotes to be handled can be stacked; two rejectors 302 each of which feeds out a banknote fed from the hopper 301 into a housing 310 when the banknote is determined as a reject note such as a counterfeit note or a suspect note; an operation unit 303 with which the operator inputs commands; four stackers 306a to 306d into each of which banknotes whose denomination, authenticity, and fitness have been recognized in the housing 310 are sorted and stacked; and a display 305 that displays information including the banknote recognition and counting results and the stacking status in each of the stackers 306a to 306d. Based on the results of fitness determination by the recognition unit, fit notes are stored in the stackers 306a to 306c and soiled notes are stored in the stacker 306d among the four stackers 306a to 306d. Any method may be used to sort the banknotes into the stackers 306a to 306d.

Structure of Imaging Unit

Figure 5:
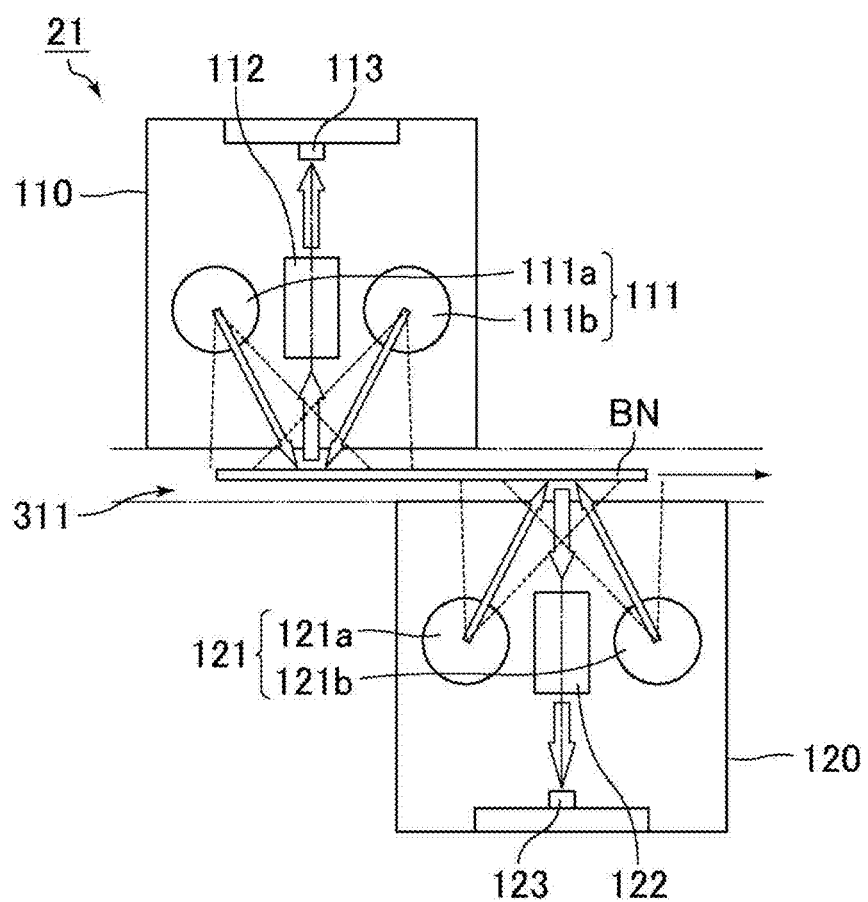
FIG. 5 is a schematic cross-sectional view showing a structure for an imaging unit in a fluorescence/phosphorescence detector of Embodiment 1.

Next, the structure of an imaging unit, which is the key device of the fluorescence/phosphorescence detector of the present embodiment, is described with reference to FIGS. 5 to 7. As shown in FIG. 5, an imaging unit 21 includes optical line sensors 110 and 120 opposing each other. Between the optical line sensors 110 and 120 is provided a space in which banknotes BN are transported. This space defines part of a transport path 311 of the banknote handling device of the present embodiment. The optical line sensors 110 and 120 are positioned above and below the transport path 311, respectively.

The optical line sensor 110 includes a reflection light source 111 having two light sources 111a and 111b and serving as a light emitting unit, a condensing lens 112, and a light receiving unit (light receiver) 113. The reflection light source 111 can irradiate a main surface (hereinafter, surface A) of each banknote BN facing the light receiving unit 113 with light rays having different wavelengths. For example, the light sources 111a and 111b each emit ultraviolet light as excitation light for observing fluorescence and phosphorescence from the surface A of each banknote. The condensing lens 112 collects light emitted from the reflection light source 111 and reflected on a banknote BN and light (fluorescence and phosphorescence) emitted from the surface A of the banknote BN. The light receiving unit 113 includes a plurality of imaging elements (light receiving elements, not shown) arranged in a line in the direction (main scanning direction) orthogonal to the transport direction (sub-scanning direction) of banknotes BN to receive light collected by the condensing lens 112 and convert the light to electrical signals. The light receiving unit 113 then amplifies the electrical signals, converts the amplified signals to digital data by A/D conversion, and outputs the digital data as image data. The image data output from the light receiving unit 113 includes fluorescence data based on fluorescence emitted from the surface A of a banknote BN and phosphorescence data based on phosphorescence emitted from the surface A of the banknote BN.

The optical line sensor 120 includes a reflection light source 121 having two light sources 121a and 121b and serving as a light emitting unit, a condensing lens 122, and a light receiving unit (light receiver) 123. The reflection light source 121 can irradiate a main surface (hereinafter, surface B) of each banknote BN facing the light receiving unit 123 with light rays having different wavelengths. For example, the light sources 121a and 121b each emit ultraviolet light as excitation light for observing fluorescence and phosphorescence from the surface B of each banknote. The condensing lens 122 collects light emitted from the reflection light source 121 and reflected on a banknote BN and light (fluorescence and phosphorescence) emitted from the surface B of the banknote BN. The light receiving unit 123 includes a plurality of imaging elements (light receiving elements, not shown) arranged in a line in the direction orthogonal to the transport direction of banknotes BN to receive light collected by the condensing lens 122 and convert the light to electrical signals. The light receiving unit 123 then amplifies the electrical signals, converts the amplified signals to digital data by A/D conversion, and outputs the digital data as image data. The image data output from the light receiving unit 123 includes fluorescence data based on fluorescence emitted from the surface B of a banknote BN and phosphorescence data based on phosphorescence emitted from the surface B of the banknote BN.

Each of the light sources 111 and 121 (111a, 111b, 121a, 121b) includes a linear light guide (not shown) extending in the direction (the main scanning direction) perpendicular to the plane of paper of FIG. 5 and a plurality of light emitters (not shown) provided at each end (or one end) of the light guide. Each of the light sources 111 and 121 may include light emitters arranged in the direction perpendicular to the transport direction of banknotes BN without including a light guide. Each of the light sources 111 and 121 includes, as a light emitter(s), one or more LED elements capable of emitting excitation light such as ultraviolet light, for example.

Each of the optical line sensors 110 and 120 repeatedly takes images of each banknote BN transported in the transport direction and outputs image signals. Thus, the fluorescence/phosphorescence detector of the present embodiment acquires an image of the entire banknote BN. The fluorescence/phosphorescence detector of the present embodiment acquires a reflection image of the surface A of a banknote BN based on the output signals from the optical line sensor 110 and a reflection image of the surface B of the banknote BN based on the output signals from the optical line sensor 120.

Since the optical line sensors 110 and 120 shown in FIG. 5 have a similar configuration to each other, the output level of the phosphorescence data can be made the same for the optical line sensor 110 and the optical line sensor 120.

Figure 6:
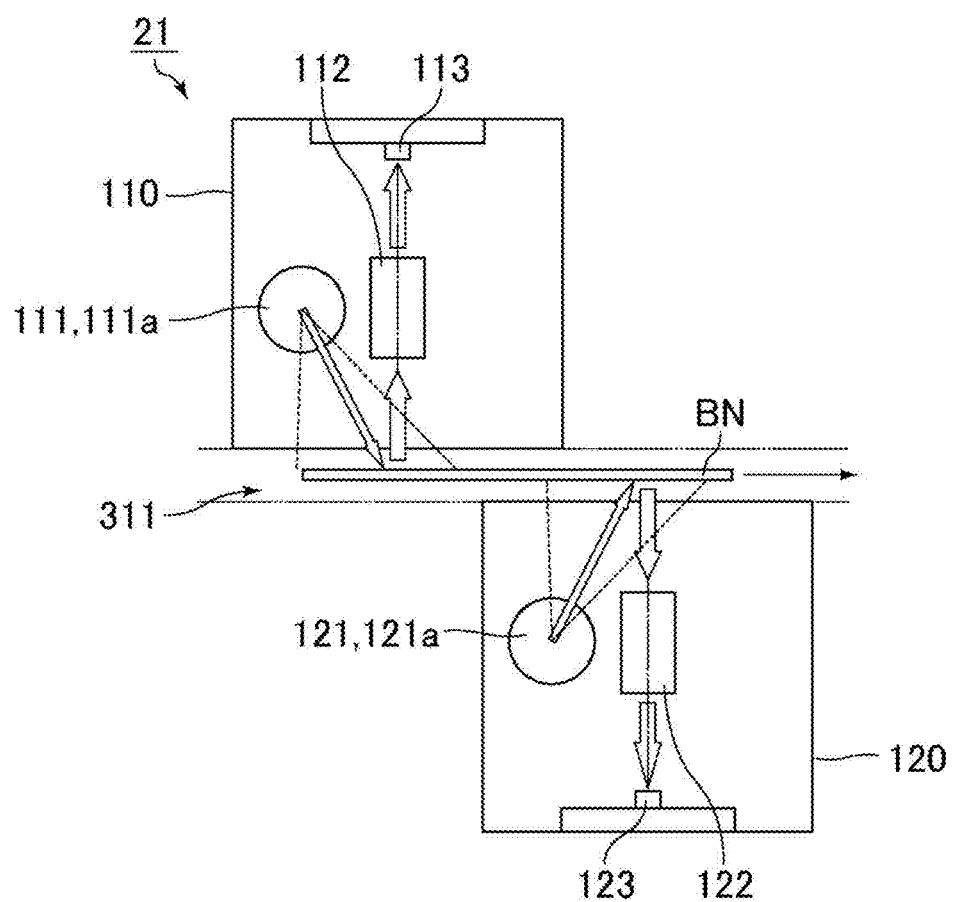
FIG. 6 is a schematic cross-sectional view showing another structure for the imaging unit in the fluorescence/phosphorescence detector of Embodiment 1.

As shown in FIG. 6, the reflection light source 111 of the optical line sensor 110 may be defined by only the light source 111a arranged upstream in the transport direction of banknotes BN without the light source 111b arranged downstream in the transport direction of banknotes BN. Similarly, the reflection light source 121 of the optical line sensor 120 may be defined by only the light source 121*a* arranged upstream in the transport direction of banknotes BN without the light source 121*b* arranged downstream in the transport direction of banknotes BN. Since each of the optical line sensors 110 and 120 shown in FIG. 6 includes an upstream light source, the output level of the phosphorescence data is usually the same for the optical line sensor 110 and the optical line sensor 120.

Figure 7:
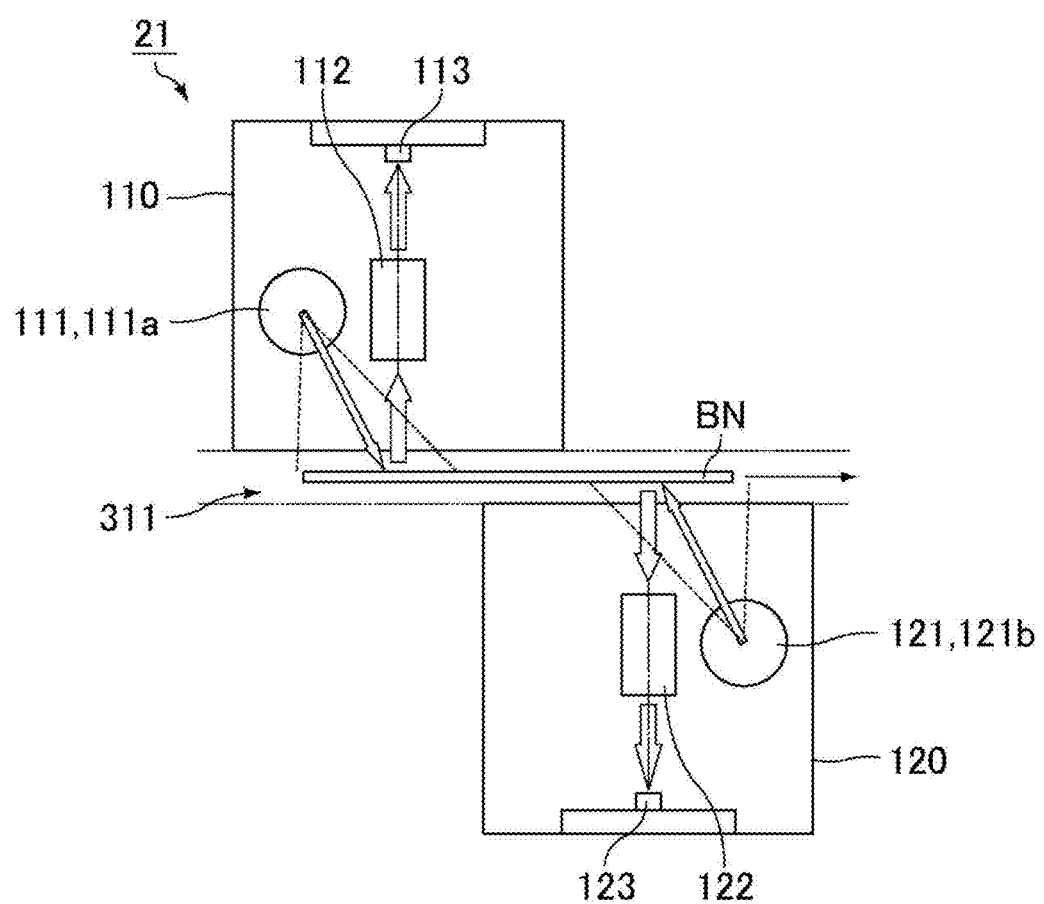
FIG. 7 is a schematic cross-sectional view showing yet another structure for the imaging unit in the fluorescence/phosphorescence detector of Embodiment 1.

As shown in FIG. 7, the reflection light source 111 of the optical line sensor 110 may be defined by only the light source 111*a* arranged upstream in the transport direction of banknotes BN without the light source 111*b* arranged downstream in the transport direction of banknotes BN. Meanwhile, the reflection light source 121 of the optical line sensor 120 may be defined by only the light source 121*b* arranged downstream in the transport direction of banknotes BN without the light source 121*a* arranged upstream in the transport direction of banknotes BN. In other words, the same unit as the optical line sensor 110 may be arranged upside down as the optical line sensor 120. In this case, the optical line sensor 110 includes the upstream light source 111*a* while the optical line sensor 120 includes the downstream light source 121*b*. Thus, differently from the cases shown in FIGS. 5 and 6, the output level of the phosphorescence data from the optical line sensor 110 is generally larger than that from the optical line sensor 120. This is because the period (range) in which a banknote BN is irradiated with light from the upstream light source 111*a* until the banknote BN reaches the measurement position for the optical line sensor 110 is longer than the period (range) in which the banknote BN is irradiated with light from the downstream light source 121*b* until the banknote BN reaches the measurement position for the optical line sensor 120.

Structure of Fluorescence/phosphorescence Detector

The structure of the fluorescence/phosphorescence detector of the present embodiment is described with reference to FIG. 8. In addition to the structure shown in any one of FIGS. 5 to 7, a fluorescence/phosphorescence detector 1 of the present embodiment includes a control unit (controller) 10 and a storage unit 30. The reflection light sources 111 and 121, the light receiving units 113 and 123, and the storage unit 30 are connected to the control unit 10. The control unit 10 controls these units to achieve the functions and operations described in the present embodiment.

The storage unit 30 is defined by a nonvolatile storage device such as a semiconductor memory or a hard disk. The storage unit 30 stores software programs and data necessary for the operation of the control unit 10. The data on the measurement modes and the data on the correspondence between the measurement modes and the types of banknotes are stored in the storage unit 30.

The control unit 10 includes a light source control unit 11 and a data acquisition unit 12. The control unit 10 includes, for example, software programs for executing various processings, a central processing unit (CPU) that executes the software programs, and various hardware devices controlled by the CPU.

The light source control unit 11 executes dynamic lighting control for sequentially turning on the light sources 111 and 121 in order to capture images of individual banknotes using the light sources 111 and 121. Specifically, the light source control unit 11 controls turning on and off of each of the light sources 111 and 121 based on the timings set in the measurement parameters. This control is executed using a mechanical clock that varies depending on the transport speed of a banknote and a system clock that is output at a constant frequency regardless of the transport speed of a banknote. The light source control unit 11 also sets the magnitude of forward current supplied to each LED element based on the measurement parameters.

The data acquisition unit 12 controls the timing of reading image data from each of the optical line sensors 110 and 120 based on the timing set in the measurement parameters, and reads image data including fluorescence data and phosphorescence data from each line sensor in synchronization with the timing of turning on and off the corresponding light source 111 or 121. This control is executed using the mechanical clock and the system clock. The data acquisition unit 12 then sequentially stores the read image data, i.e., line data, in the ring buffer (line memory) of the storage unit 30.

Here, the line data means data based on image data obtained by one-time image capturing using the optical line sensor 110 or 120, and corresponds to data on one line in the lateral direction (direction orthogonal to the transport direction of banknotes) of the acquired image.

The fluorescence/phosphorescence detector 1 is arranged along the transport path 311 in the banknote handling device of the present embodiment. The banknote handling device of the present embodiment uses the data obtained by measuring light emitted from a banknote using the fluorescence/phosphorescence detector 1 to recognize the denomination, authenticity, and the like characteristics of the banknote. The banknote handling device of the present embodiment controls transportation of banknotes along the transport path 311. The banknote handling device of the present embodiment is configured to receive instructions from the operator at an operation unit 303, for example, to change the transport speed of a banknote. The banknote handling device of the present embodiment can switch the transport speed of a banknote to a different transport speed such as 2300 mm or 1600 mm per second.

Figure 8:
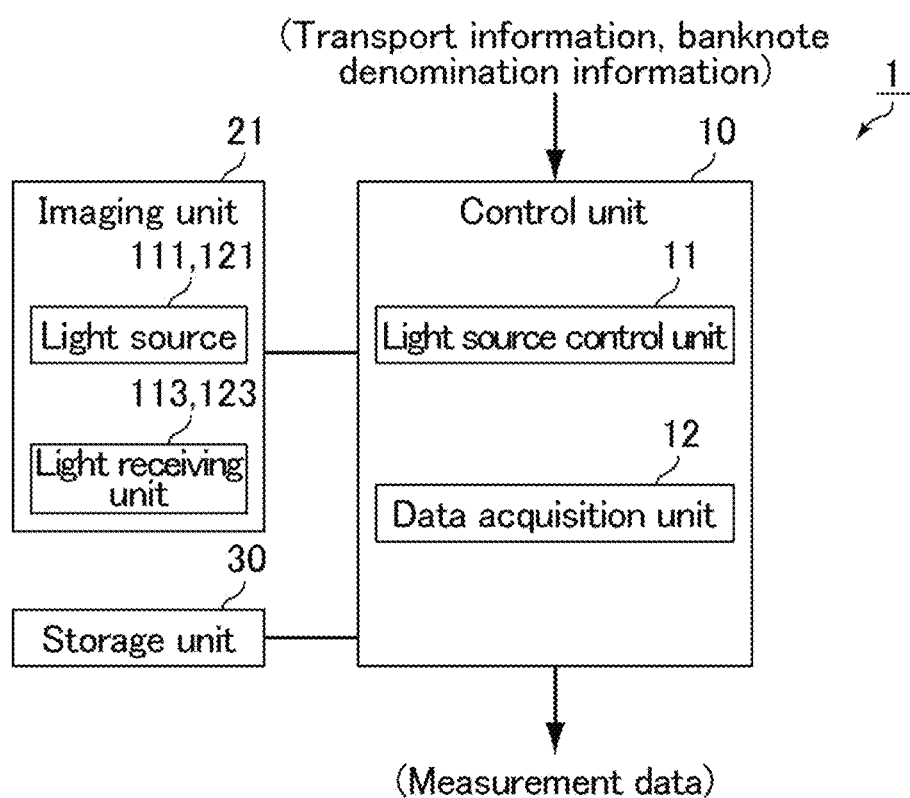
FIG. 8 is a block diagram showing the functional structure of the fluorescence/phosphorescence detector of Embodiment 1.

As shown in FIG. 8, the control unit 10 acquires transport information and banknote denomination information, for example, from the banknote handling device of the present embodiment. The transport information includes the transport speed, transport state, and transport position, for example, of each banknote transported along the transport path 311. The banknote denomination information includes the denominations and the like of banknotes transported along the transport path 311.

A recognition unit that recognizes banknotes is arranged upstream of the fluorescence/phosphorescence detector 1 in the transport direction. When the recognition unit recognizes the denomination and the like of a banknote, the recognized information is input to the control unit 10 as banknote denomination information. The control unit 10 may select a measurement mode corresponding to the type of the banknote based on the banknote denomination information.

In the transport path 311 is arranged a banknote detection sensor that detects the transport position of each banknote. The banknote detection sensor can also identify the transport states of banknotes, including whether a transported banknote is skewed and whether transported banknotes are overlaid. Having acquired the information including the transport speed, transport state, and transport position, for example, of a banknote, the control unit 10 recognizes the timing when the banknote passes the measurement position (imaging position) for each of the optical line sensors 110 and 120, for example.

Specifically, the control unit 10 recognizes the timing when a banknote passes the measurement position for the optical line sensor 110. Based on this timing, the light source control unit 11 controls the light source 111. The data acquisition unit 12 acquires data obtained by measuring the light emission from the surface A of the banknote from the light receiving unit 113. Based on the acquired data, banknote images of the entire surface A of the banknote can be generated. Specifically, a surface A fluorescence image of fluorescence on the entire surface A and a surface A phosphorescence image of phosphorescence on the entire surface A can be generated.

Similarly, the control unit 10 recognizes the timing when a banknote passes the measurement position for the optical line sensor 120. Based on this timing, the light source control unit 11 controls the light source 121. The data acquisition unit 12 acquires data obtained by measuring the light emission from the surface B of the banknote from the light receiving unit 123. Based on the acquired data, banknote images of the entire surface B of the banknote can be generated. Specifically, a surface B fluorescence image of fluorescence on the entire surface B and a surface B phosphorescence image of phosphorescence on the entire surface B can be generated.

Furthermore, based on the transport speed of the banknote acquired by the control unit 10, the light source control unit 11 controls the amount of light (excitation light) applied from the light sources 111 and 121 to the banknote per unit time. This allows application of excitation light to a banknote in a desired amount that is suitable for the fluorescence and phosphorescence measurements regardless of the transport speed of the banknote. More specifically, the light source control unit 11 controls the light sources 111 and 121 such that as the transport speed of the banknote increases, the amount of light applied to the banknote per unit time increases. Here, in the case where the light sources 111 and 121 each include a LED element as an emitter, the amount of light is represented by (magnitude of forward current of LED element)×(irradiation time). The light source control unit 11 therefore increases the magnitude of forward current of each LED element of each of the light sources 111 and 121 as the transport speed of the banknote increases.

Timing of Measuring Fluorescence and Phosphorescence

Next, the timing of measuring fluorescence and phosphorescence in the present embodiment is described with reference to FIGS. 9 to 12. FIGS. 9 to 12 show one cycle of measurement (imaging). Images of each entire surface of a banknote can be generated by repeating the measurement with data obtained in one cycle of measurement as line data. The resolution of each of the light receiving units 113 and 123 in the main scanning direction perpendicular to the transport direction of banknotes is 200 dpi. Meanwhile, the resolution in the sub-scanning direction parallel to the transport direction of banknotes is approximately 5.6 dpi. The method of measuring the light emission from the surface A of a banknote using the optical line sensor 110 is the same as the method of measuring the light emission from the surface B of the banknote using the optical line sensor 120. Thus, the case of the optical line sensor 110 is described below as an example.

The upper part of the timing chart shown in each of FIGS. 9 to 12 shows the mechanical clock (MCLK) output in response to the transport of a banknote. Every time the banknote transported along the transport path 311 moves by 0.254 mm, a pulse signal of one pulse having a rectangular waveform is output. The middle part shows the timing of turning on the light source 111. The lower part shows the timing of measuring fluorescence and the timing of measuring phosphorescence using the light receiving unit 113.

Figure 9:
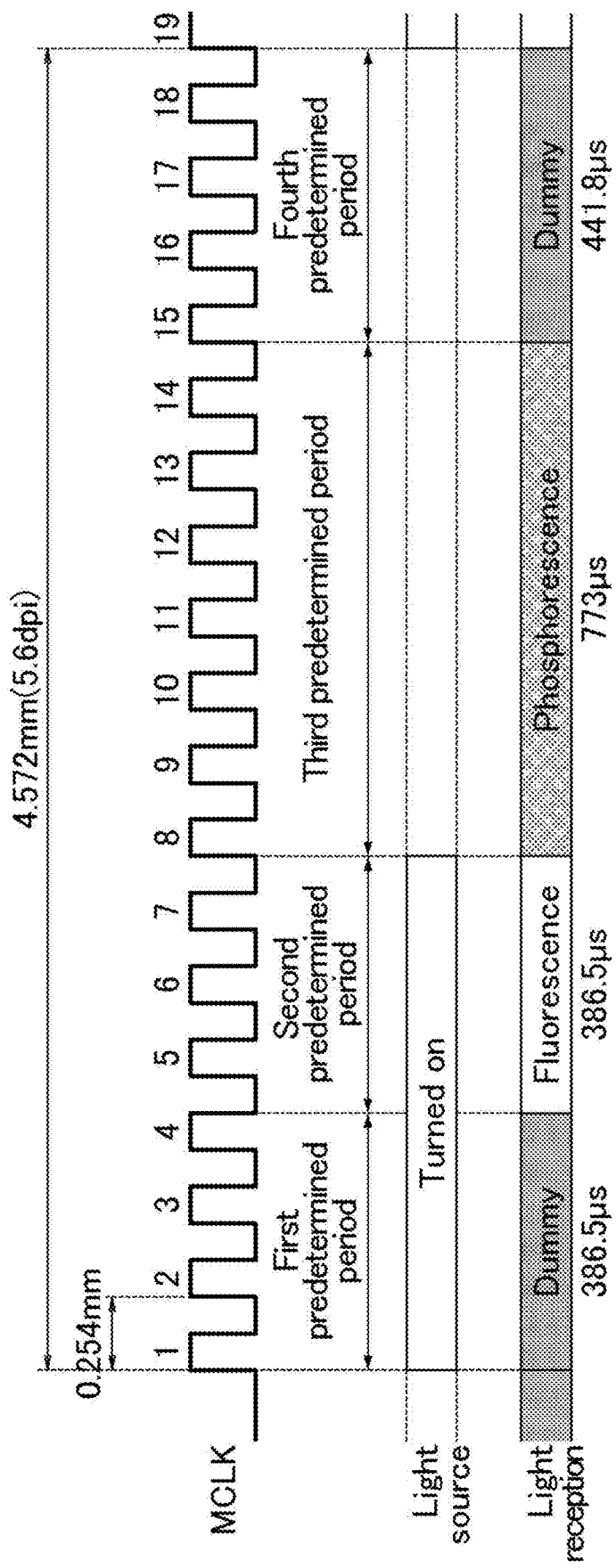
FIG. 9 is a timing chart showing the timing of measuring fluorescence and phosphorescence in Embodiment 1 in a case where a banknote is transported at a transport speed of 2300 mm/s.

In the case shown in FIG. 9, the light source control unit 11 turns on the light source 111 with a predetermined emission intensity in response to the rising of the mechanical clock pulse wave. The light source control unit 11 turns off the light source 111 after the lapse of, for example, 773 μs (=386.5 μs+386.5 μs).

When the light source control unit 11 turns on the light source 111, fluorescence emission is observed on the surface A of the banknote. When the light source control unit 11 turns on the light source 111, the first predetermined period, which is for example 386.5 μs, starts as a dummy period in which the light receiving unit 113 does not receive fluorescence and phosphorescence. After the lapse of the first predetermined period, the light source control unit 11 keeps the light source 111 turned on for the second predetermined period, which is for example 386.5 μs. When the second predetermined period starts, the light receiving unit 113 starts fluorescence reception. In other words, each imaging element of the light receiving unit 113 is exposed to light and accumulates the electric charge. The fluorescence reception continues for 386.5 μs, for example. In the third predetermined period, which is for example 773 μs, after the lapse of the second predetermined period, the light receiving unit 113 outputs fluorescence data and the data acquisition unit 12 reads the fluorescence data. Also, when the third predetermined period starts (at the same time when the light source control unit 11 turns off the light source 111), the light receiving unit 113 starts phosphorescence reception. In other words, each imaging element of the light receiving unit 113 is exposed to light and accumulates the electric charge. The phosphorescence reception continues for 773 μs, for example. In this manner, the phosphorescence reception time (exposure time) is preferably the same as the fluorescence reception time (exposure time) or longer than the fluorescence reception time (exposure time). In the fourth predetermined period, which is for example 441.8 μs, after the lapse of the third predetermined period, the light receiving unit 113 outputs phosphorescence data and the data acquisition unit 12 reads the phosphorescence data. The fourth prescribed period is a dummy period in which the light receiving unit 113 does not receive fluorescence and phosphorescence. After the lapse of the fourth predetermined period, one cycle of measurement ends and the next cycle of measurement starts. In the first predetermined period, which is a dummy period, the data acquisition unit 12 does not acquire (read) fluorescence data and phosphorescence data.

While a banknote passes the measurement position for the optical line sensor 110, the light source control unit 11 and the data acquisition unit 12 can measure both fluorescence and phosphorescence on the entire surface of the banknote by repeating the cycle shown in FIG. 9. One cycle of measurement is executed during 1987.8 μs (=386.5 μs+386.5 μs+773 μs+441.8 μs), which corresponds to 18 cycles of mechanical clock. During this time, the banknote transported at 2300 mm/s moves by 4.572 mm. Therefore, the resolution in the sub-scanning direction is approximately 5.6 dpi.

In the measurement mode shown in FIG. 9, the lighting time of the light source 111 is longer than in the case where the first predetermined period (dummy period) is not provided. The amount of light applied to a banknote increases as the emission time becomes longer. Therefore, in the measurement mode shown in FIG. 9, the emission intensity of phosphorescence is higher than in the case where the first predetermined period (dummy period) is not provided. As a result, a clear phosphorescence image can be obtained.

In addition, the light receiving unit 113 starts phosphorescence reception immediately after the end of the emission in the second predetermined period, i.e., immediately after the end of the fluorescence reception by the light receiving unit 113. This can reduce the difference between the position of fluorescence measurement and the position of phosphorescence measurement.

Figure 10:
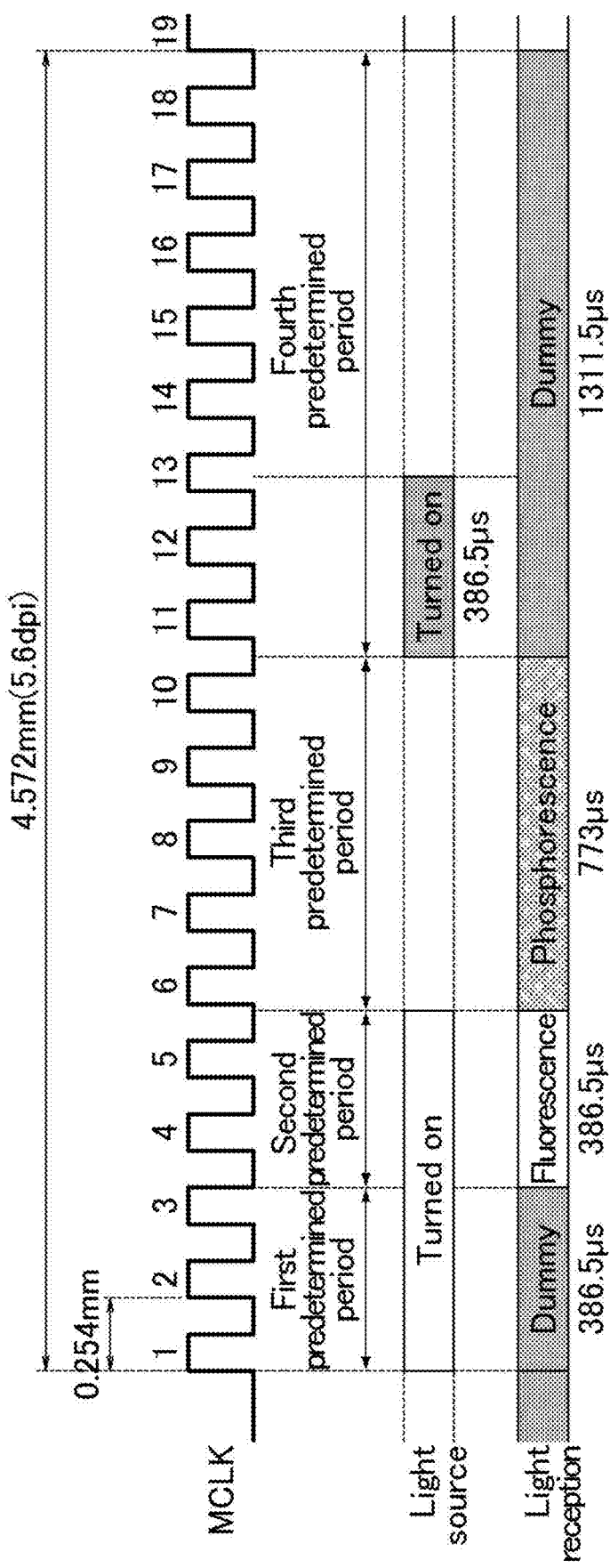
FIG. 10 is a timing chart showing the timing of measuring fluorescence and phosphorescence in Embodiment 1 in a case where a banknote is transported at a transport speed of 1600 mm/s.

FIG. 10 shows one cycle of measurement as in FIG. 9. While the transport speed of a banknote is 2300 mm/s in FIG. 9, the transport speed of a banknote is 1600 mm/s in FIG. 10. Therefore, the time corresponding to one pulse of mechanical clock during which a banknote is transported over a distance of 0.254 mm is approximately 110 µs in FIG. 9 whereas it is approximately 159 µs in FIG. 10.

As shown in FIG. 10, even when the transport speed of a banknote is 1600 mm/s, turning on of the light source 111, acquisition of fluorescence data, and acquisition of phosphorescence data are executed at the same timing and over the same time period as in FIG. 9.

Also in a case where the transport speed is 1600 mm/s, fluorescence reception and phosphorescence reception can be ended in 1546 µs (=386.5 µs+386.5 µs+773 µs) as in the case where the transport speed is 2300 mm/s.

As shown in FIGS. 9 and 10, even when the transport speeds are different, 18 pulses of mechanical clock are defined as one cycle. The time difference due to the difference in the transport speed is eliminated by changing the length of the fourth predetermined period after the lapse of the third predetermined period, i.e., the length of the dummy period. Specifically, in a case where the transport speed is 2300 mm/s, the dummy period continues for 441.8 µs, for example, after phosphorescence reception as shown in FIG. 9. Meanwhile, in a case where the transport speed is 1600 mm/s, the dummy period after phosphorescence reception is set to 1311.5 µs, for example, as shown in FIG. 10.

Even when the transport speed is 1600 mm/s, both fluorescence and phosphorescence can be measured on the entire surface of a banknote. One cycle of measurement is executed during 2857.5 µs (=386.5 µs+386.5 µs+773 µs+1311.5 µs), which corresponds to 18 cycles of mechanical clock. During this time, the banknote transported at 1600 mm/s moves by 4.572 mm. Therefore, the resolution in the sub-scanning direction is approximately 5.6 dpi, as in the case where the transport speed is 2300 mm/s.

In a case where the transport speed is 2300 mm/s, as shown in FIG. 9, when the light source 111 is turned off after the lapse of the first and second predetermined periods (773 µs) following the start of one cycle of measurement, the light source 111 is kept turned off until the end of the one cycle of measurement. Meanwhile, in a case where the transport speed is 1600 mm/s, as shown in FIG. 10, the light source 111 is turned off after the lapse of the first and second predetermined periods (773 µs) following the start of one cycle of measurement, but the light source 111 is turned on again when the phosphorescence reception ends. The light source 111 that has been turned on again is turned off after the lapse of 386.5 µs, for example. The light source 111 is turned on again in the dummy period (fourth predetermined period) in which fluorescence and phosphorescence are not received. As shown in FIG. 10, when the lighting off time of the light source 111 becomes long after the end of the fluorescence and phosphorescence reception, the light source 111 is turned on again at the timing and for a duration which do not affect the fluorescence and phosphorescence measurements. This can prevent phosphorescence from completely disappearing, enabling stable phosphorescence measurement. The number and time of re-lighting operations after the phosphorescence reception can be appropriately set according to the transfer speed of the banknote. For example, the light source 111 may be turned on twice or more after the phosphorescence reception if the transport speed of the banknote is lower.

Although FIG. 10 shows measurement when the transport speed is 1600 mm/s, the transport speed may be changed to a different speed. For example, when the transport speed is 1200 mm/s, turning on of the light source 111, acquisition of fluorescence data, and acquisition of phosphorescence data are executed at the same timing and for the same duration as in FIGS. 9 and 10 during 18 pulses of mechanical clock. The extra time due to the decrease in the transport speed is adjusted by changing the length of the fourth predetermined period, i.e., the length of the dummy period. The re-lighting operation for the light source 111 during the dummy period is varied according to the time of one cycle. For example, the re-lighting time during the dummy period is 386.5 µs in FIG. 10 where the transport speed is 1600 mm/s. The re-lighting time during the dummy period is changed to 773 µs (386.5 µs×2) when the transport speed is 1200 mm/s, for example.

Figure 11:
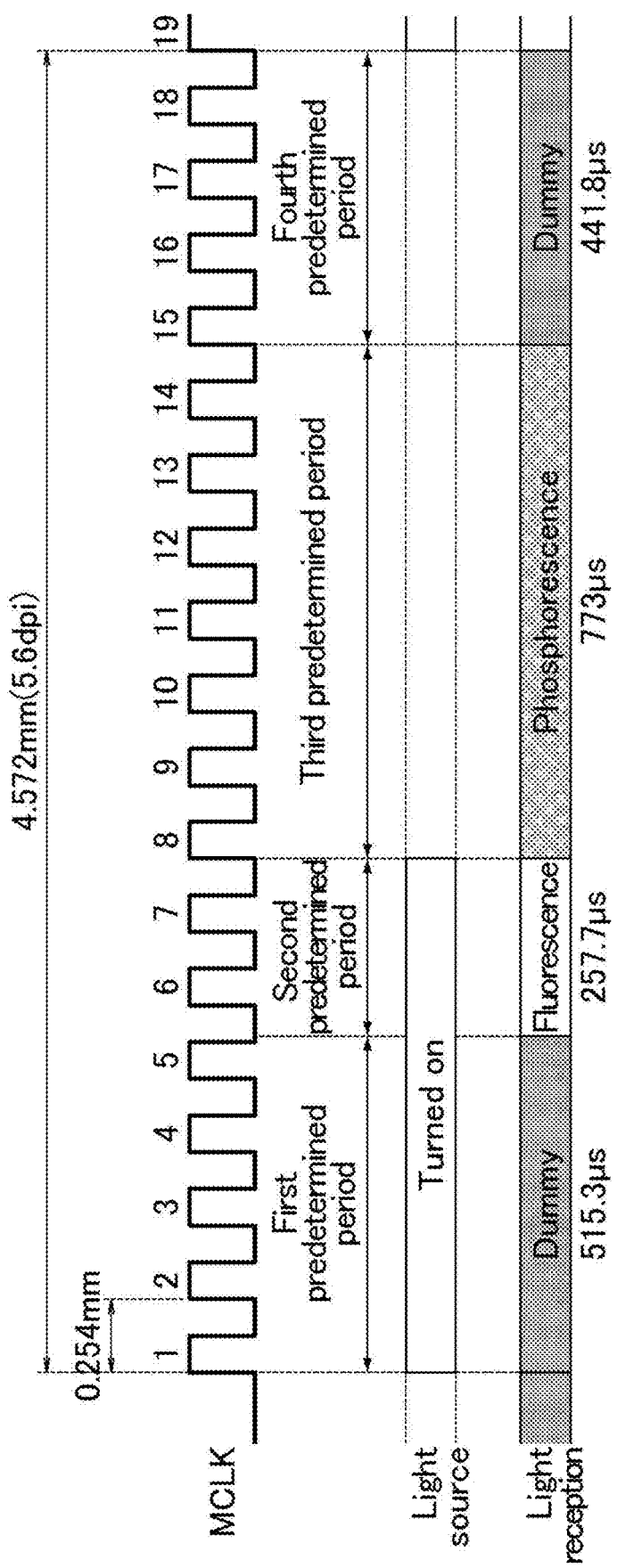
FIG. 11 is a timing chart showing the timing of measuring fluorescence and phosphorescence in Embodiment 1 in another case where a banknote is transported at a transport speed of 2300 mm/s.
Figure 12:
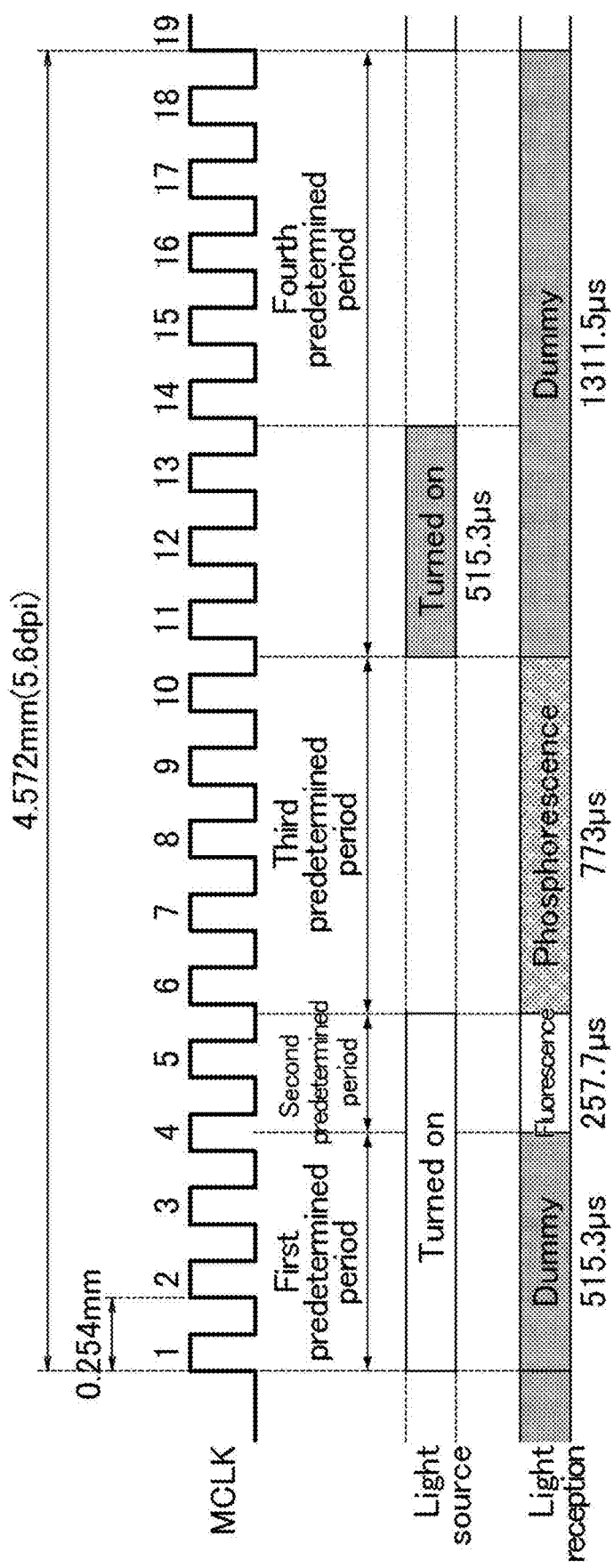
FIG. 12 is a timing chart showing the timing of measuring fluorescence and phosphorescence in Embodiment 1 in another case where a banknote is transported at a transport speed of 1600 mm/s.

FIGS. 11 and 12 show one cycle of measurement as in FIGS. 9 and 10. While the length of the first predetermined period is the same as the length of the second predetermined period in FIGS. 9 and 10, the length of the first predetermined period is longer than the length of the second predetermined period in FIGS. 11 and 12. FIG. 11 is the same as FIG. 9, except that the length of the first predetermined period is different from the length of the second predetermined period. FIG. 12 is the same as FIG. 10, except that the length of the first predetermined period is different from the length of the second predetermined period. In FIGS. 11 and 12, for example, the first predetermined period is 515.3 µs and the second predetermined period is 257.7 µs. The amount of light applied to a banknote in the second predetermined period can therefore be made smaller than the amount of light applied to the banknote in the first predetermined period. This can prevent blown-out highlights due to saturation of the outputs (fluorescence data) from the light receiving unit 113 upon fluorescence reception.

In each of the cases shown in FIGS. 9 to 12, the emission intensity of the light source 111 during the second predetermined period may be different from the emission intensity of the light source 111 during the first predetermined period. For example, as shown in FIG. 2, the emission intensity of the light source 111 during the second predetermined period may be smaller than the emission intensity of the light source 111 during the first predetermined period. Also, in the cases shown in FIGS. 10 and 12, the emission intensity of the light source 111 which is turned on again during the fourth predetermined period may be different from the emission intensity of the light source 111 during the first predetermined period, and may be different from the emission intensity of the light source 111 during the second predetermined period. FIGS. 9 and 10 correspond to the detection method shown in FIGS. 1 and 2. FIGS. 11 and 12 correspond to the detection method shown in FIG. 3.

Procedure of Processing Executed by Fluorescence/phosphorescence Detector

Figure 13:
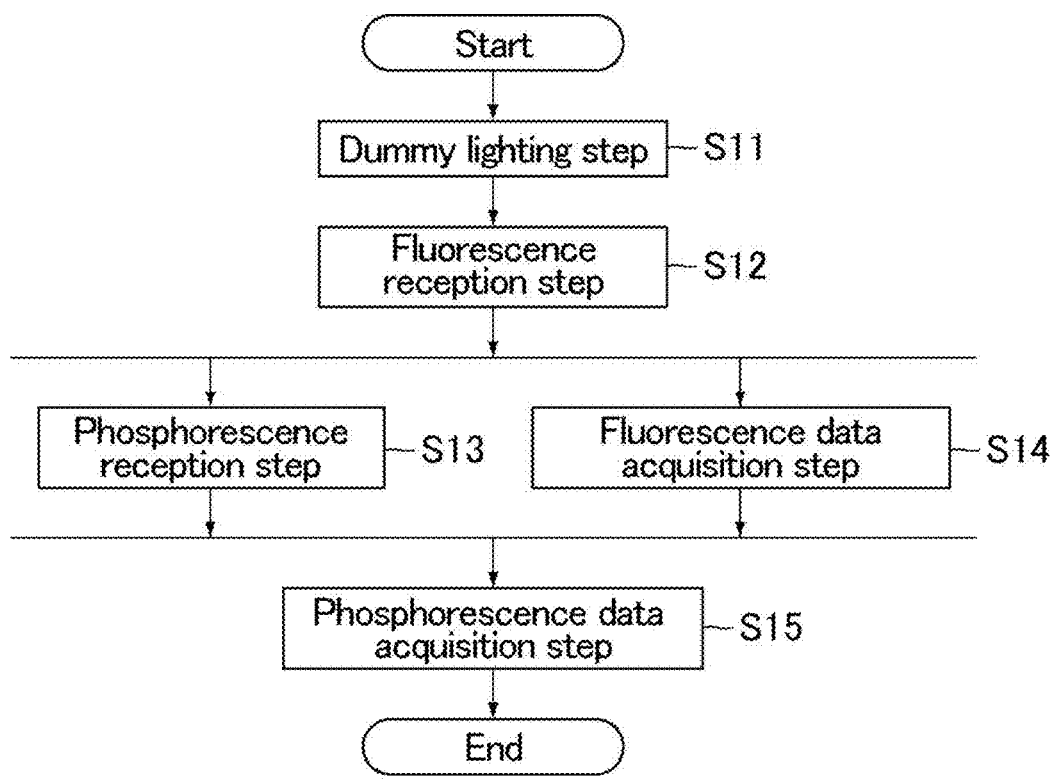
FIG. 13 is a flowchart showing the procedure of acquiring fluorescence data and phosphorescence data in the fluorescence/phosphorescence detector and a fluorescence/phosphorescence detection method of Embodiment 1.

Described below with reference to FIG. 13 is the procedure of the processing executed by the fluorescence/phosphorescence detector 1, in particular, the procedure of the processing of the fluorescence/phosphorescence detection method that acquires fluorescence data and phosphorescence data. Here, the fluorescence/phosphorescence detection method using the optical line sensor 110 is described. The case of using the optical line sensor 120 is the same, and thus description thereof is omitted.

As shown in FIG. 13, first, the light source control unit 11 turns on the light source 111 and irradiate a transported banknote with light for the first predetermined period (dummy lighting step S11). The light source control unit 11 turns on the light source 111 after the lapse of the first predetermined period, and while the light source control unit 11 irradiates the banknote with light in the second predetermined period, fluorescence emitted from the banknote is received using the light receiving unit 113 (fluorescence reception step S12). After the lapse of the second predetermined period, while the light source control unit 11 keeps the light source 111 turned off for the third predetermined period, phosphorescence emitted from the banknote is received using the light receiving unit 113 (phosphorescence reception step S13). Also, during the phosphorescence reception step S13, the data acquisition unit 12 acquires fluorescence data based on the fluorescence received by the light receiving unit 113 in the second predetermined period (fluorescence data acquisition step S14). After the phosphorescence reception step S13, the data acquisition unit 12 acquires phosphorescence data based on the phosphorescence received by the light receiving unit 113 in the third predetermined period (phosphorescence data acquisition step S15).

The fluorescence data acquisition step S14 and the phosphorescence data acquisition step S15 may be executed at any timing after execution of the fluorescence reception step S12 and at any timing after the phosphorescence reception step S13, respectively. For efficient procedure of the processing, as described above, the fluorescence data acquisition step S14 is preferably executed during the phosphorescence reception step S13, and the phosphorescence data acquisition step S15 is preferably executed during the fourth predetermined period, i.e., the dummy period, after the lapse of the third predetermined period.

As described above, in the embodiment above, the light sources 111 and 121 are turned on in the first predetermined period, are turned on in the second predetermined period after the first predetermined period, and are then kept turned off for the third predetermined period after the second predetermined period, so that fluorescence data on fluorescence received by the light receiving units 113 and 123 in the second predetermined period and phosphorescence data on phosphorescence received by the light receiving units 113 and 123 in the third predetermined period are acquired. Thus, fluorescence data and phosphorescence data can be acquired in the successive first and second predetermined periods. This can reduce the difference between the position where fluorescence is detected and the position where phosphorescence is detected. Also, since the light sources 111 and 121 are turned on in the first predetermined period before the second predetermined period in which fluorescence is measured, the amount of light applied to a banknote can be sufficient for clear phosphorescence emission.

In the embodiment above, the case is described where the emission intensities of the light sources 111 and 121 are set to be lower in the second predetermined period than in the first predetermined period or the second predetermined period is set to be shorter than the first predetermined period, so that the amount of the light applied to a banknote during the second predetermined period is smaller than the amount of light applied to the banknote during the first predetermined period. Here, both the emission intensity and the length of the period may be differentiated between the first predetermined period and the second predetermined period. As described above, in the case where each of the light sources 111 and 121 includes a LED element as an emitter, the amount of light is represented by (magnitude of forward current for LED element)×(irradiation time). The amount of light can therefore be set as appropriate by varying the magnitude of forward current for each LED element in each of the light sources 111 and 121 and/or the irradiation time (time during which the imaging elements accumulate the electric charge). Thus, in order to make the amount of light applied to a banknote in the second predetermined period smaller than the amount of light applied to the banknote in the first predetermined period, for example, the value of forward current flowing to each LED element of each of the light sources 111 and 121 in the second predetermined period may be made smaller than the value of forward current flowing to each LED element of each of the light sources 111 and 121 in the first predetermined period, while the length of the second predetermined period is made shorter than the length of the first predetermined period.

In addition, in the embodiment above, the case is described where ultraviolet light is applied as excitation light to a banknote, i.e., the case where the light sources 111 and 121 are ultraviolet light sources. However, the wavelength of excitation light applied to a banknote is not limited. Any wavelength that excites the special ink used for printing on a banknote for light emission may be selected as the wavelength of light from each of the light sources 111 and 121. For example, infrared light or visible light may be applied as excitation light to a banknote. In other words, each of the light sources 111 and 121 may be an infrared light source or a visible light source. Also, each of the light sources 111 and 121 may emit at least two types of light selected from ultraviolet light, infrared light, and visible light as excitation light. In other words, each of the light sources 111 and 121 may be an ultraviolet/infrared light source that emits ultraviolet light and infrared light, an infrared/visible light source that emits infrared light and visible light, an ultraviolet/visible light source that emits ultraviolet light and visible light, or an ultraviolet/infrared/visible light source that emits ultraviolet light, infrared light, and visible light.

In the embodiment above, the mode is employed where the fluorescence/phosphorescence detector of the present disclosure is used for fluorescence and phosphorescence measurements. However, the fluorescence/phosphorescence detector of the present disclosure can also be used to acquire images of a banknote on which neither fluorescence nor phosphorescence is observed. For example, each of the light sources 111 and 121 is set to be capable of emitting visible light as well as excitation light such as ultraviolet light or infrared light, for example. In the case of a banknote containing light-emitting ink, the banknote is irradiated with excitation light as described above for acquisition of a fluorescence image and a phosphorescence image. In contrast, in the case of a banknote containing no light-emitting ink, each of the light sources 111 and 121 is set to apply visible light to the banknote such that a reflection image of the banknote is acquired. Thus, even in the case of handling a banknote on which light emission is not observed, the fluorescence/phosphorescence detector of the present disclosure can be effectively used. For example, after the recognition unit acquires a banknote image with a predetermined resolution, the fluorescence/phosphorescence detector of the present disclosure may acquire a banknote image with a resolution different from that of the image acquired by the recognition unit to use the image for recognition of the banknote.

In addition, in the embodiment above, the mode is employed where the fluorescence/phosphorescence detector of the present disclosure acquires light emission data from both surfaces of a banknote. However, in the case where only one surface of a banknote emits light, light emission data may be acquired from only the one surface of the banknote. For example, when the light-emitting surface of a transported banknote is the surface A, fluorescence data and phosphorescence data are acquired from the surface A of the banknote as described above. Specifically, the recognition unit arranged upstream in the transport direction identifies whether the light-emitting surface of a transported banknote is the surface A or the surface B. The fluorescence/phosphorescence detector of the present disclosure can acquire light emission data from the surface A or the surface B, whichever identified as the light-emitting surface by the recognition unit.

In the embodiment above, the mode is employed where each of the light sources 111 and 121 is kept turned on for the time period indicated as "Turned on" in FIGS. 9 to 12. However, the lighting time may be controlled within the range shown in the figures. Specifically, the range indicated as "Turned on" in the figures may be the range in which each of the light sources 111 and 121 can be turned on, and each of the light sources 111 and 121 may be kept turned on only for some time within the range. The fluorescence/phosphorescence detector of the present disclosure can control the emission time of each of the light sources 111 and 121 within the range indicated in the figures according to the type of light emitted from each of the light sources 111 and 121, the emission intensity of the light, the type of light emission observed on a banknote, and other conditions. Also, for example, each of the light sources 111 and 121 may be turned on and off multiple times within the range shown in the figures.

An embodiment of the present disclosure has been described above with reference to the drawings. The present disclosure is not limited to the embodiment. Also, the structures of the embodiment may be combined or modified as appropriate within the range not departing from the gist of the present disclosure.

INDUSTRIAL APPLICABILITY

As described above, the present disclosure provides a technique useful in detecting fluorescence and phosphorescence from a transported sheet.

What is claimed is:

1. A detector that detects fluorescence and phosphorescence emitted from a transported sheet, the detector comprising:
   a light source to irradiate the transported sheet with light;
   a light receiver to receive the fluorescence and the phosphorescence emitted from the transport sheet; and
   a controller configured to
      control the light source to turn on in a first predetermined period, turn on in a second predetermined period after the first predetermined period, and turn off for a third predetermined period which is immediately after the second predetermined period;
      control the light receiver to receive the fluorescence in the second predetermined period but not in the first predetermined period, and to receive the phosphorescence in the third predetermined period;
      acquire, from the light receiver, fluorescence data on the fluorescence received by the light receiver in the second predetermined period but not in the first predetermined period; and
      acquire, from the light receiver, phosphorescence data on the phosphorescence received by the light receiver in the third predetermined period.

2. The detector according to claim 1, wherein the controller is further configured to control the light source such that a first amount of light applied to the sheet in the first predetermined period is larger than a second amount of light applied to the sheet in the second predetermined period.

3. The detector according to claim 1, wherein the controller is further configured to control an amount of light emitted from the light source per unit time based on a transport speed of the sheet.

4. The detector according to claim 1, wherein after a lapse of the third predetermined period, the controller is further configured to control the light source to turn on at least once in a fourth predetermined period in which the light receiver does not receive fluorescence and phosphorescence.

5. The detector according to claim 1, wherein the light source is an ultraviolet light source.

6. The detector according to claim 1, wherein the light source is an infrared light source.

7. The detector according to claim 1, wherein the light source is a visible light source.

8. A sheet handling device comprising the detector according to claim 1.

9. A detection method, comprising:
   turning on a light source and irradiating a transported sheet with light emitted from the light source in a first predetermined period;
   turning on the light source and irradiating the sheet with light emitted from the light source in a second predetermined period after the first predetermined period;
   turning the light source off for a third predetermined period which is immediately after the second predetermined period;
   acquiring, from a light receiver, fluorescence data on fluorescence emitted from the transport sheet and received by the light receiver in the second predetermined period but not in the first predetermined period; and
   acquiring, from the light receiver, phosphorescence data on phosphorescence emitted from the transport sheet and received by the light receiver in the third predetermined period.

* * * * *